UNITED STATES PATENT OFFICE.

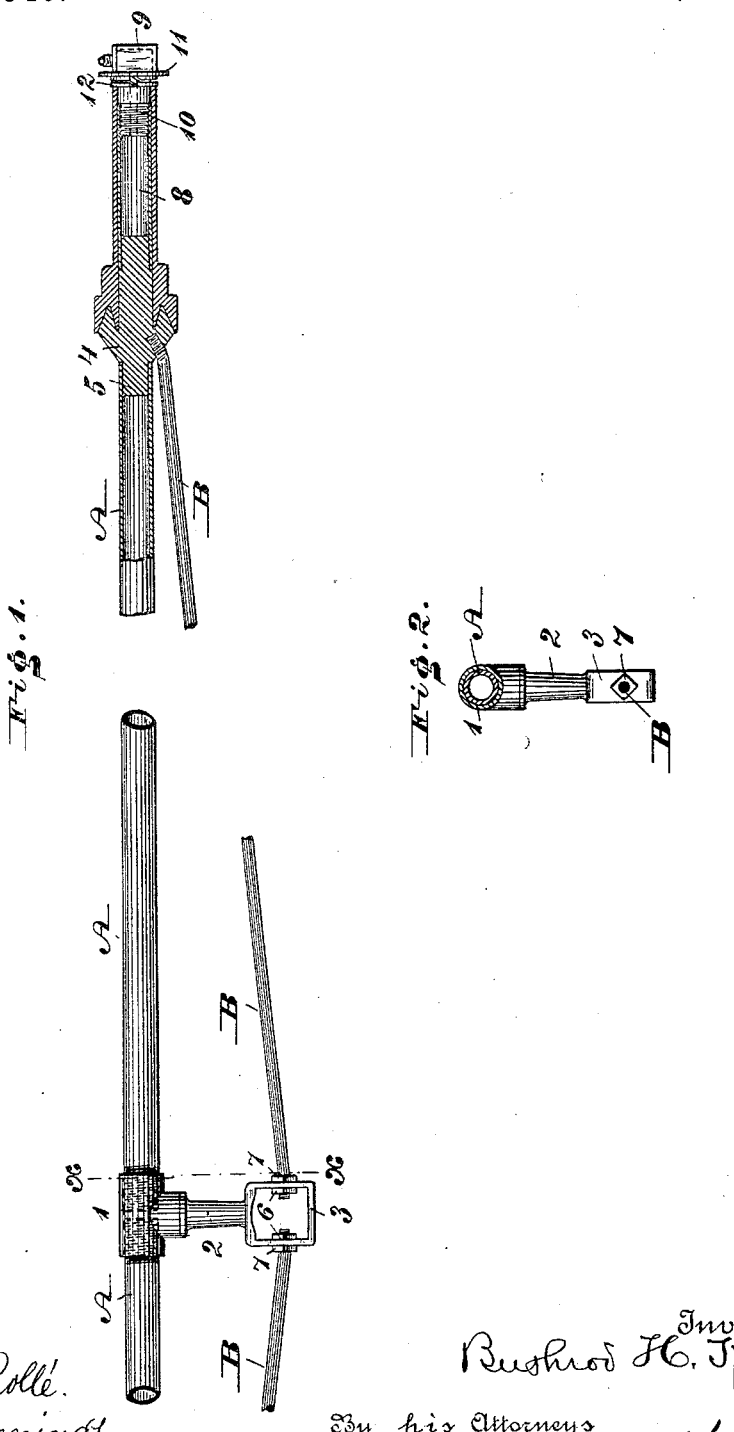

BUSHROD H. KEMBLE, OF CAMDEN, NEW JERSEY.

AXLE.

SPECIFICATION forming part of Letters Patent No. 453,840, dated June 9, 1891.

Application filed October 12, 1888. Renewed April 16, 1891. Serial No. 389,132. (No model.)

*To all whom it may concern:*

Be it known that I, BUSHROD H. KEMBLE, a citizen of the United States, formerly residing in the city and county of Philadelphia, State of Pennsylvania, now residing in the city and county of Camden, State of New Jersey, have invented a new and useful Improvement in Axles, which improvement is fully set forth in the following specification and accompanying drawings.

My invention consists in constructing an axle with trusses, whereby the same possesses great strength and durability, as will be hereinafter fully set forth.

It also consists in the combination of parts, as herein set forth and claimed.

Figure 1 represents a partial side elevation and partial longitudinal section of an axle embodying my invention. Fig. 2 represents a vertical section on line $x\ x$, Fig. 1.

Similar letters and numerals of reference denote corresponding parts in the several figures.

Referring to the drawings, A represents an axle of tubular form and constructed of steel, said axle being formed in sections connected by a coupling 1, from which depends a post or hanger 2, to whose lower end is secured an open piece or eye 3, the sides of which have threaded openings to receive the inner ends of the truss-rods B, the outer ends whereof are screwed or otherwise connected with collars 4, the latter being formed with plugs or necks 5, which enter the outer ends of the tubular or hollow axle A and are secured thereto. On the inner or lower ends of the truss-rods are nuts 6 7, which bear against opposite sides of the eye or frame 3 and serve to tighten the connection of the truss-rods with said frame, and consequently with the axle, it being evident that the axle is braced by the truss-rods and the parts which connect said rods with the axle, so that the strength and durability of the axle are increased. The truss may be strained or tightened when required by properly rotating the nuts 6, which are accessible in the opening of the eye 3, the nuts 7, which act as jam-nuts, being also properly rotated. Each plug or neck 5 and collar 4 are integral with the journal or bearing portion 8, on which the box revolves, whereby the journal is firmly connected with the axle, it being seen that the plug enters the axle, and thus also strengthens the contiguous ends of the same.

The nut 9, which confines the box, and consequently the wheel, on the journal, is hollow, forming a lubricator, the same having a tubular neck 10, which screws into the journal, the bore of said neck forming a communication between the journal and the combined lubricator and nut. Interposed between the box and the flange 11 on the inner side of the nut is a split washer 12, which serves to prevent rattling of the parts in contact and takes up lost motion thereof as the box and flange or nut wear away, in which case the nut is tightened, thus compressing the washer.

Having thus described my invention, what I claim as new, and desire to secure by Letters Patent, is—

1. A hollow sectional axle with a coupling having a hanger thereon with eyes in its side walls, collars secured to said axle at its ends, and truss-rods adjustably secured to said hanger and collars, said parts being combined substantially as described.

2. An axle formed in sections and a coupling therefor and a hanger on said coupling having an eye, in combination with truss-rods secured to said section and eye and nuts at the inner ends of the truss-rods bearing against said eye, substantially as described.

3. A hollow axle and a truss-rod, in combination with a plug carrying a journal and entering the axle, one end of the truss-rod being secured to said plug and the other end to a hanger secured to said axle, substantially as described.

B. H. KEMBLE.

Witnesses:
 JOHN A. WIEDERSHEIM,
 A. P. JENNINGS.